July 11, 1950  E. SHURTS  2,514,676
MILK CLAW
Filed Dec. 11, 1946

INVENTOR
Englebert Shurts
BY
David G. Fox
ATTORNEY

Patented July 11, 1950

2,514,676

UNITED STATES PATENT OFFICE 2,514,676

MILK CLAW

Englebert Shurts, Waukesha, Wis.

Application December 11, 1946, Serial No. 715,373

3 Claims. (Cl. 31—83)

This invention relates to milking machine claws and it resides in an improved form of the same in which a transverse open ended straight walled access barrel having removable sight closures is centered with respect to straight walled teat cup branch connections which emerge therefrom upwardly and obliquely to form a balanced structure, the barrel being provided with a straight walled milk tube nipple which emerges therefrom downwardly and obliquely.

One object of this invention is to provide a claw which may be maintained in sanitary condition with greater convenience and greater certainty by providing a claw such that all milk conducting surfaces thereof may be rendered accessible to direct brushing for cleaning purposes and in which all milk conducting surfaces may be easily exposed to direct visual inspection.

Another object of this invention is to provide a claw which when assembled with teat cups and milk tube, and attached to a cow's udder, balances so as not to exert more weight upon one particular quarter of the udder than another.

Another object of this invention is to provide a claw with oppositely disposed sight openings closed by sight glasses which permit observation of the progress of milking.

Another object is to provide a claw possessed of the foregoing advantages which may be provided with removable pulsator connections so as to permit sterilizing treatment to be given to milk conducting parts of the claw only.

In the common forms of milking machines a plurality of teat cups are joined by lengths of flexible tubing with a common junction fitting called a claw. The streams of milk drawn by the several cups merge in the claw fitting and pass outwardly therefrom through a flexible tube called the "milk tube" of sufficient length to reach to the milking machine proper. In order to bring about the joining of the several tubes referred to, the claw fitting is provided with a nipple to which the milk tube may be attached and with separate nipples, one for each of the tubes which lead to the teat cups. These several nipples are in communication with one another. In the common type of milking machine, in addition to the milk conveying parts above referred to, provision is also made for applying pulsating pressure to the outer shells of the teat cups. For this purpose tubing, usually duplex in character, is carried from the milking machine proper to the claw where it joins with passages which emerge in a plurality of small nipples adapted to be connected through lengths of pulsator tubing with the outer shells of the several teat cups. The claw thus is provided with additional projecting nipples and connecting passages rendering the internal construction of the claw quite complex in character. The multiplicity of nipples projecting from the claw fitting give it a form suggestive of its name.

The maintenance of a high standard of sanitary control in connection with milking equipment is essential. To this end the equipment must be subjected to thorough cleansing and sterilization at frequent intervals. The sterilizing of the claw with its many complex passages has heretofore presented a serious problem.

In accordance with this invention the claw is constructed so that all milk conveying passages are straight walled channels, preferably cylindrical, each of which has at least one exposed opening when removed from the tubing. In this way every milk conveying surface of the claw is accessible to direct visual inspection and may be reached for brushing by straight brushes. Also, if desired, less accessible pulsator passage parts are removable from the claw, and need not be subject to cleansing fluids which might leave difficultly removable residues therein.

This invention is herein described by reference to the accompanying drawing in which there is set forth by way of illustration and not of limitation one form in which a claw constructed in accordance with this invention may be constructed.

Figure 2:
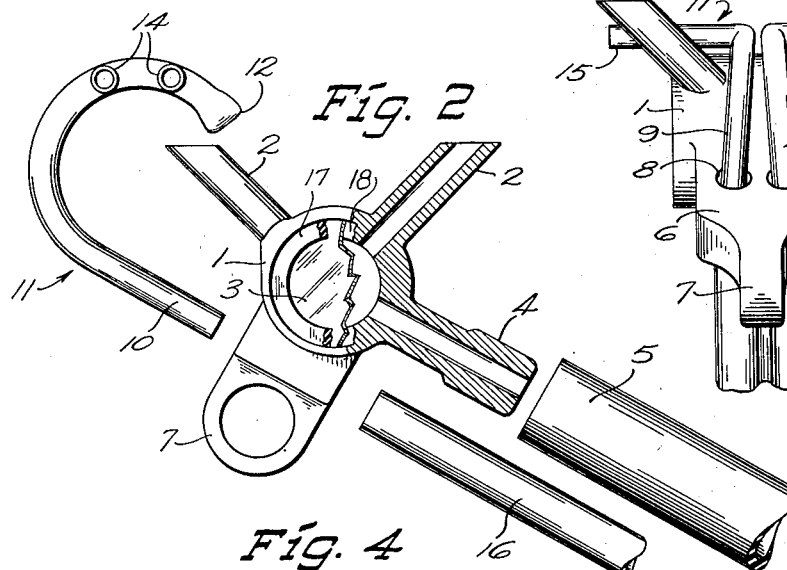
Fig. 2 is a side view in elevation parts being shown broken away and in section of the claw shown in Fig. 1 the parts being shown in separated position removed from the milk tube and pulsator tube.

As shown in the drawing, the claw of this invention as there depicted, is made up of a junction body portion 1 from which upwardly sloping teat cup connection nipples 2 emerge. The body portion 1 is formed in the shape of a hollow transverse cylinder closed at the ends by sight windows 3 through which the action of the milking machine may be observed, said sight windows 3 being received in counterbores 18. The straight cylindrical interior walls of the body 1 are freely accessible for inspection, and upon removal of the sight glasses 3, held in place by the friction of rubber washers 17, may be reached in their entirety by simple brushes. The nipples 2, as appears more clearly in Fig. 2, are tubular with straight interior walls and communicate freely with the hollow interior of the junction body 1. Emerging downwardly from the body 1 in a sloping position is a milk tube nipple 4 having a straight walled internal passage also communicating with the interior of the body 1. The nipple 4 is adapted to be frictionally engaged by a milk tube 5 composed of rubber or other flexible material.

Extending from the junction body 1 of the claw is an integrally formed boss 6 which terminates in a looped handle or eye 7. Passing through the boss 6 in a direction approximately parallel to the axis of nipple 4 is a pair of spaced pulsator assembly retaining holes 8. Arranged to be slidingly received within the retaining holes 8 are right and left hand main ends 9 and 10 of an independent pulsator connection assembly which is generally designated 11.

Figure 4:
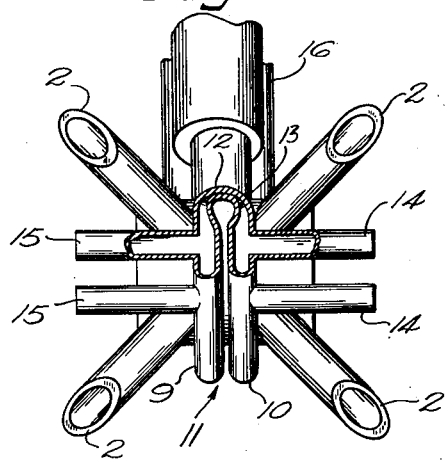
Fig. 4 is a top plan view of the claw shown in Fig. 1 with parts being shown broken away and in section.

The main ends 9 and 10 of the pulsator assembly 11 extend upwardly and around the claw body 1 to a meeting point 12 where they are mechanically joined but separated pneumatically from one another by a solder seal 13 as shown in Fig. 4. Main end 10 is provided with two branching nipples 14—14 connected therewith and adapted to be connected by pulsator tubing with the outer shells of certain of the teat cups. In similar manner main end 9 is provided with a pair of branch nipples 15—15 for the same purpose. The open ends of main ends 9 and 10 are adapted to be connected with and frictionally engaged by a flexible duplex pulsator tube 16 having two individual passages therein corresponding in spacing with the main ends 9 and 10.

Figure 1:
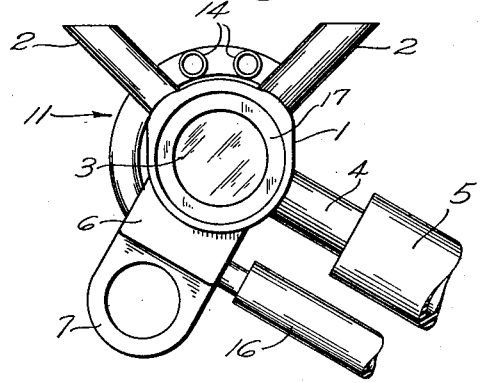
Fig. 1 is a side view in elevation of a claw constructed in accordance with this invention, the parts being shown in assembled position.
Figure 3:
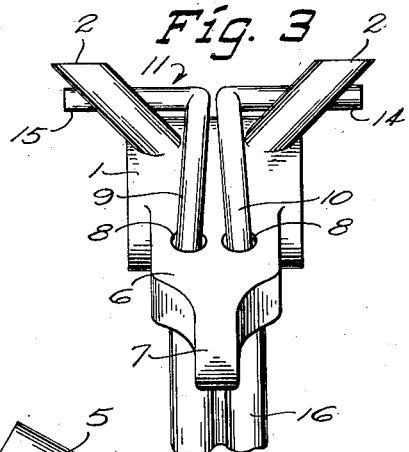
Fig. 3 is an end view in elevation of the claw shown in Fig. 1.

In Figs. 1, 3 and 4 the claw herein shown and described appears connected with a milk tube 5 and pulsator duplex tubing 16. When thus assembled the parts of the claw of this invention are maintained in the form of a unit functioning as a single claw. When it is desired to subject the claw parts to sterilization, tube 16 is removed and the pulsator assembly 11 withdrawn as shown in Fig. 2. The milk tube 5 and the claw body 1 and its associated parts which come into contact with milk may then be treated for cleansing and sterilizing in any manner desired while the pulsator assembly 11, which does not come into contact with milk, may be withheld from the sterilizing treatment. In this way the parts to be cleansed and sterilized are reduced in complexity, and passages difficult of access receive no deposit of milk residue or sterilizing solution.

As previously stated, to facilitate the cleansing of the junction body 1 the windows 3 are removably held in place by rubber washers 17, thus rendering the transverse bore of the body 1 readily accessible for brushing or other scouring treatment. The nipples 2 and 4 may also be easily scoured by straight brushes and the like, and all surfaces coming in contact with milk, milk residues or sterilizing solutions are completely visible rendering inspection more certain.

By reason of the centered relationship of the barrel 1 with respect to the nipples 2, the claw of this invention evenly loads the cow's udder with a balanced load which is little disturbed by the eccentric disposition of the milk tube 5. The downward inclination of the milk tube nipple 4 furthermore causes the milk tube 5 to assume a natural position giving rise to little or no tilting of the balanced claw further aiding in maintaining an evenly distributed load upon the cow's udder.

I claim:

1. In a milking machine claw the combination comprising a body portion having a normally horizontal straight walled inspection passage therethrough open at both ends, counterbores surrounding the openings at each end of said inspection passage, a flat disc of optically transparent material permitting transmission of an undistorted visual image disposed in each of said counterbores closing the ends of said inspection passage and providing a visual inspection channel passing completely through said inspection passage from both ends thereof, a resilient sealing ring for each of said flat transparent discs in sealing engagement with the walls of said counterbores and the faces of said transparent discs, a plurality of teat cup nipples emerging obliquely upwardly from said body portion and having straight walled passages therein entirely exposed to inspection and cleansing communicating with the interior of said body portion, and a milk tube nipple emerging downwardly from said body portion having a straight walled passage therein entirely exposed to inspection and cleansing communicating with the interior of said body portion.

2. In a milking machine claw the combination comprising a body portion having a normally horizontal straight walled inspection passage therethrough open at both ends, counterbores surrounding the openings at each end of said inspection passage, a flat disc of optically transparent material permitting transmission of an undistorted visual image disposed in each of said counterbores closing the ends of said inspection passage and providing a visual inspection channel passing completely through said inspection passage from both ends thereof, a resilient sealing ring for each of said flat transparent discs in sealing engagement with the walls of said counterbores and the faces of said transparent discs, a plurality of teat cup nipples symmetrically disposed with respect to one another emerging obliquely upwardly from said body portion and having straight walled passages therein entirely exposed to inspection and cleansing communicating with the interior of said body portion, and a milk tube nipple emerging obliquely downwardly from said body portion having a straight walled passage therein entirely exposed to inspection and cleansing communicating with the interior of said body portion.

3. In a milking machine claw the combination comprising a body portion having a normally horizontal straight walled inspection passage therethrough open at both ends the diameter of which is approximately equal to its length counterbores surrounding the openings at each end of said inspection passage, a flat disc of optically transparent material permitting transmission of an undistorted visual image disposed in each of said counterbores closing the ends of said inspection passage and providing a visual inspection channel passing completely through said inspection passage from both ends thereof, a resilient sealing ring for each of said flat transparent discs in sealing engagement with the walls of said counterbores and the faces of said transparent discs, a plurality of teat cup nipples emerging obliquely upwardly from said body portion and having straight walled passages therein entirely exposed to inspection and cleansing communicating with the interior of said body portion, and a pulsator connection assembly detachably secured to the exterior of said body portion.

ENGLEBERT SHURTS.

REFERENCES CITED

The following references are of record in the file of this patent:

UNITED STATES PATENTS

| Number | Name | Date |
|---|---|---|
| 1,018,846 | Mitchell | Feb. 27, 1912 |
| 1,385,577 | Oden | July 26, 1921 |
| 1,538,735 | Oden | May 19, 1925 |
| 2,136,956 | Schmitt | Nov. 15, 1938 |
| 2,206,816 | Levitt | July 2, 1940 |
| 2,429,983 | Bender et al. | Nov. 4, 1947 |